US 12,280,867 B2

(12) United States Patent
Lee

(10) Patent No.: US 12,280,867 B2
(45) Date of Patent: Apr. 22, 2025

(54) LEAF SPRING TYPE LANDING GEAR

(71) Applicant: KOREA AEROSPACE RESEARCH INSTITUTE, Daejeon (KR)

(72) Inventor: Jung Jin Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 179 days.

(21) Appl. No.: 18/055,807

(22) Filed: Nov. 15, 2022

(65) Prior Publication Data

US 2023/0150655 A1 May 18, 2023

(30) Foreign Application Priority Data

Nov. 16, 2021 (KR) .................. 10-2021-0157193

(51) Int. Cl.
*B64C 25/58* (2006.01)
*B64C 25/04* (2006.01)
*B64C 25/06* (2006.01)
*B64C 25/32* (2006.01)

(52) U.S. Cl.
CPC .............. *B64C 25/58* (2013.01); *B64C 25/04* (2013.01); *B64C 25/06* (2013.01); *B64C 2025/325* (2013.01)

(58) Field of Classification Search
CPC .... B64C 25/62; B64C 2025/325; B64C 25/58
See application file for complete search history.

(56) References Cited

U.S. PATENT DOCUMENTS

| 4,196,878 A * | 4/1980 | Michel ................... B64C 25/52 244/108 |
| 4,645,143 A * | 2/1987 | Coffy ..................... B64C 25/52 244/108 |
| 10,850,834 B2 | 12/2020 | Duval et al. |
| 11,192,641 B2 | 12/2021 | Prud'Homme-Lacroix et al. |
| 11,230,372 B1 * | 1/2022 | Griffin .................... B64C 25/34 |
| 2007/0181744 A1 * | 8/2007 | Bietenhader ............ B64C 25/52 244/108 |

(Continued)

FOREIGN PATENT DOCUMENTS

JP      H1053199 A      2/1998
KR      101542806 B1      8/2015

OTHER PUBLICATIONS

"Bebop 2 shock landing gear," YouTube Website, Available Online at https://www.youtube.com/watch?v=3bs2jehNKvs, Mar. 10, 2017, 1 page.

*Primary Examiner* — Richard Green
*Assistant Examiner* — Nevena Aleksic
(74) *Attorney, Agent, or Firm* — McCoy Russell LLP

(57) ABSTRACT

The present disclosure relates to a leaf spring type landing gear mounted on a lower portion of a fuselage of an aircraft, and more particularly, to a leaf spring type landing gear having improved performance for mitigation and absorption of shocks, including: a first frame connected to the fuselage and bent to have a circle center below; a second frame connected to the first frame; and a third frame connected to the second frame and at least partially bent to have a circle center below, wherein the second frame includes a 2-1st frame and a 2-2nd frame having circle centers formed in opposite directions and is formed to be bent in an S shape.

12 Claims, 15 Drawing Sheets

(56) References Cited

U.S. PATENT DOCUMENTS

| | | | |
|---|---|---|---|
| 2013/0264419 A1* | 10/2013 | Rammer | B64C 27/001 244/108 |
| 2014/0084109 A1 | 3/2014 | Prud'Homme-Lacroix | |
| 2015/0151836 A1 | 6/2015 | Prud'Homme-Lacroix et al. | |
| 2019/0176976 A1 | 6/2019 | Duval et al. | |

* cited by examiner

LEAF SPRING TYPE LANDING GEAR

CROSS-REFERENCE TO RELATED APPLICATIONS

The present application claims priority to Korean Patent Application No. 10-2021-0157193 filed on Nov. 16, 2021. The entire contents of is the above-listed application are hereby incorporated by reference for all purposes.

TECHNICAL FIELD

The following disclosure relates to a leaf spring type landing gear, and more particularly, to a leaf spring type landing gear that is connected to a lower portion of a fuselage of an aircraft to absorb shocks generated during takeoff and landing.

BACKGROUND

A landing gear is disposed on a lower portion of a fuselage of an aircraft to absorb shocks generated during takeoff and landing on the ground. In addition, a load generated during landing is increased to several times the weight of the fuselage, and accordingly, the landing gear is disposed to prevent the fuselage from being destroyed due to energy transferred from the load to the fuselage.

The landing gear is implemented in various types of landing gears such as oleo-pneumatic type, hydraulic type, pneumatic type, and elastic body type landing gears, and is coupled to the fuselage of the aircraft. Referring to FIG. 1, the elastic body type landing gear is easy to design, manufacture, and assemble and is light as compared to other types of landing gears such as the oleo-pneumatic type landing gear. Therefore, the elastic body type landing gear has been widely used in a small craft, an unmanned aerial vehicle, a helicopter, and the like. The elastic body type landing gear receives a high impact load due to limitation in strain, and is vulnerable to absorption of shocks because dissipated energy due to friction or the like is smaller than that in the other types of landing gears. In the case of the elastic body type landing gear, when the aircraft lands at a relatively high speed, the aircraft bounces into the air due to the high impact load, which may lead to an accident.

In order to solve the problem of the elastic body type landing gear as described above, development such as forming a landing gear with various composite materials or changing a shape of a landing gear has been conducted. Accordingly, the present applicant has disclosed a landing gear for an aircraft with wheels having a shape including a plurality of landing members in Korean Patent Publication No. 10-1542806 (Landing gear for aircraft with wheels, method of determining shape of landing gear for aircraft with wheels, and program recording medium, hereinafter, referred to as the "related art"). Referring to FIG. 2, the landing gear for an aircraft with wheels of the related art includes a frame connecting a fuselage and wheels in a form in which a plurality of quadrants are combined, in which the frame includes three quadrants consisting of a first quadrant, a second quadrant, and a third quadrant from an upper portion to the ground. Therefore, in this case, an impact load and a bounce load may be significantly reduced while geometric restrictions are reduced, and thus, the problem of the elastic body type landing gear according to the related art is solved.

Furthermore, development has been conducted in various fields to further improve the performance of the aircraft, and research and development of a landing gear having higher efficiency than the landing gear disclosed in the related art have been conducted. In addition, development has been conducted to improve the performance of the aircraft while minimizing a weight of the landing gear so that the aircraft has higher performance and higher efficiency.

RELATED ART DOCUMENT

Patent Document

KR 10-1542806 B1 (published on Aug. 7, 2015)

SUMMARY

An embodiment of the present disclosure is directed to providing a landing gear having higher performance and higher efficiency, and an object of the present disclosure is to provide a leaf spring type landing gear including a frame having a shape with higher performance for mitigation and absorption of shocks.

In one general aspect, a leaf spring type landing gear mounted on a lower portion of a fuselage of an aircraft includes: a first frame connected to the fuselage and bent to have a circle center below; a second frame connected to the first frame; and a third frame connected to the second frame and at least partially bent to have a circle center below, wherein the second frame includes a 2-1st frame and a 2-2nd frame having circle centers formed in opposite directions and is formed to be bent in an S shape.

The first frame, the second frame, and the third frame may be integrally formed.

A pair of the second frame and the third frame may be disposed at each of both ends of the first frame to be formed in a spraddle-legged shape.

The third frame may include a 3-1st frame connected to the second frame and bent to have a circle center below and a 3-2nd frame connected to the 3-1st frame and bent to have a circle center above, and may be formed to be bent in an S shape.

The 3-2nd frame may come into contact with the ground when the aircraft lands.

The leaf spring type landing gear may further include a damper having both ends connected to the 2-1st frame and the 2-2nd frame, respectively.

The damper may be disposed so that the other end is inclined at a predetermined angle with respect to a lower side from one end connected to the 2-1st frame, and the predetermined angle may be formed at −10° to +15°.

A vertical height of the second frame may be greater than a vertical height of each of the first frame and the third frame.

The vertical height of the third frame may be greater than the vertical height of the first frame.

An inflection point between the 2-1st frame and the 2-2nd frame may be located at the center in both directions with respect to ends of the first frame and the third frame.

The circle centers of the 2-1st frame and the 2-2nd frame may be formed in the both directions, respectively.

The leaf spring type landing gear may further include a wheel connected to the other end of the third frame.

Other features and aspects will be apparent from the following detailed description, the drawings, and the claims.

DETAILED DESCRIPTION OF EMBODIMENTS

Hereinafter, a leaf spring type landing gear having the configuration as described above according to the present disclosure will be described in detail with reference to the accompanying drawings.

Figure 1:
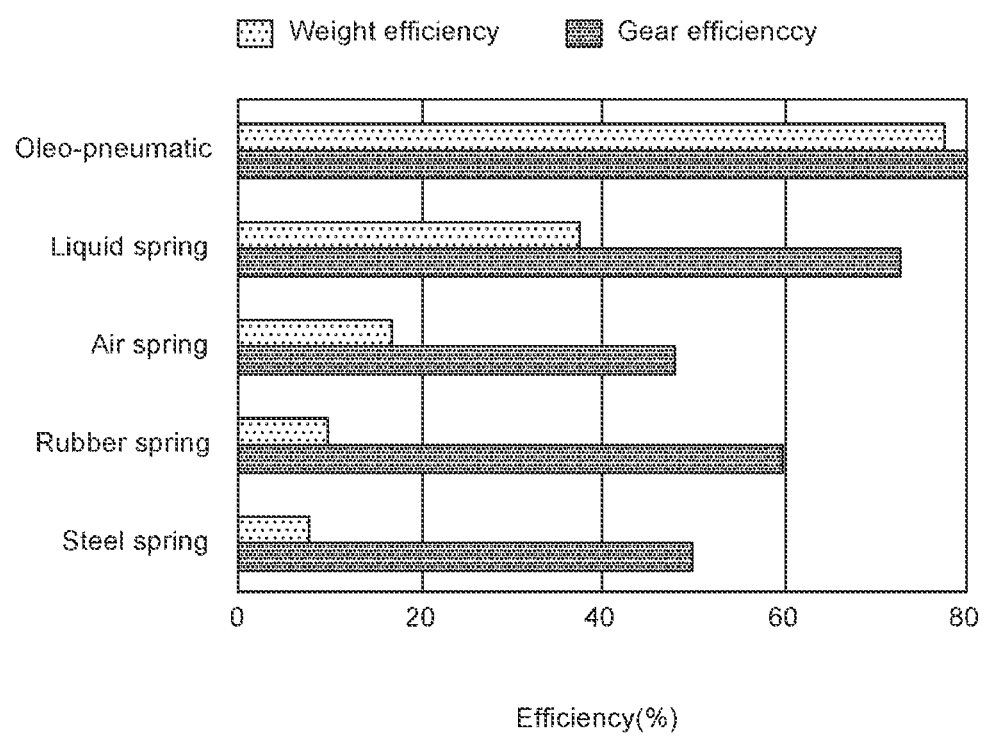
FIG. 1 is a view illustrating comparisons of weight efficiency and gear efficiency according to types of landing gears.
Figure 2:
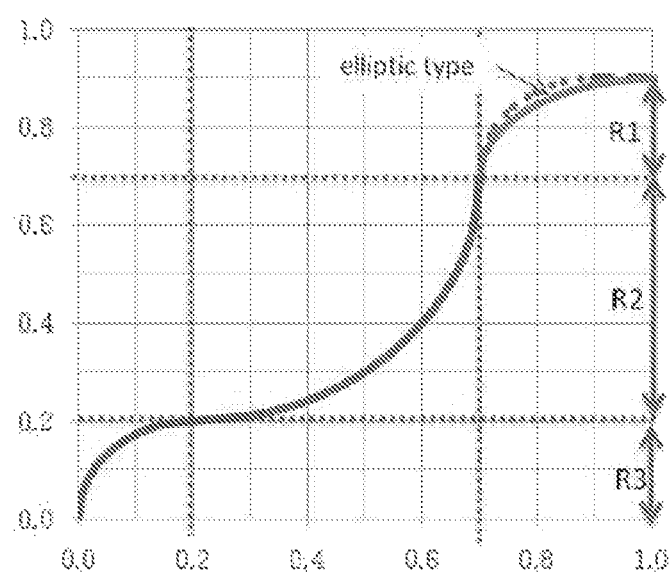
FIG. 2 is a view illustrating a frame of a landing gear for an aircraft with wheels according to the related art.
Figure 3:
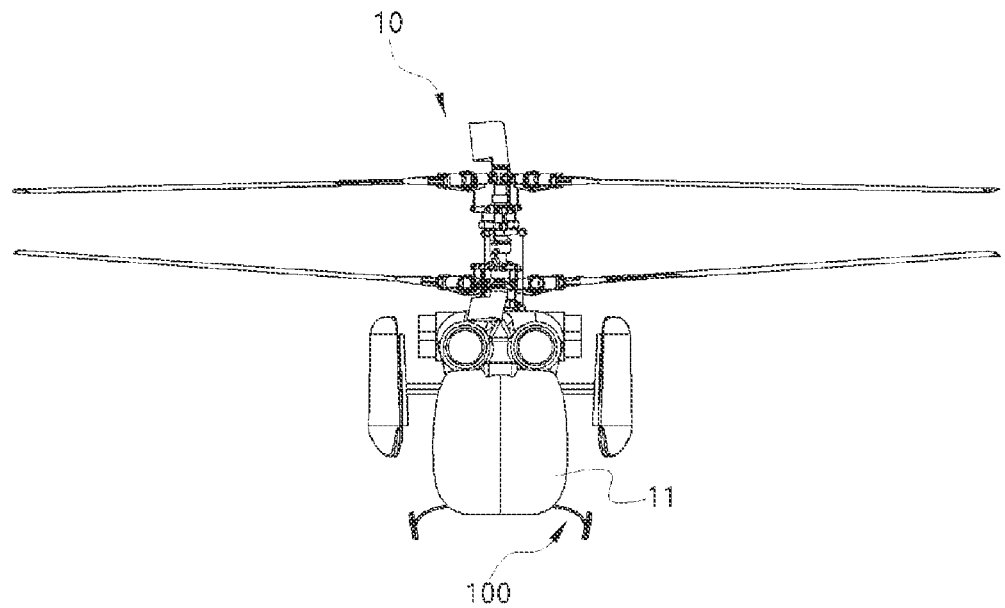
FIG. 3 is a front view of an aircraft on which a leaf spring type landing gear according to the present disclosure is mounted.
Figure 4:
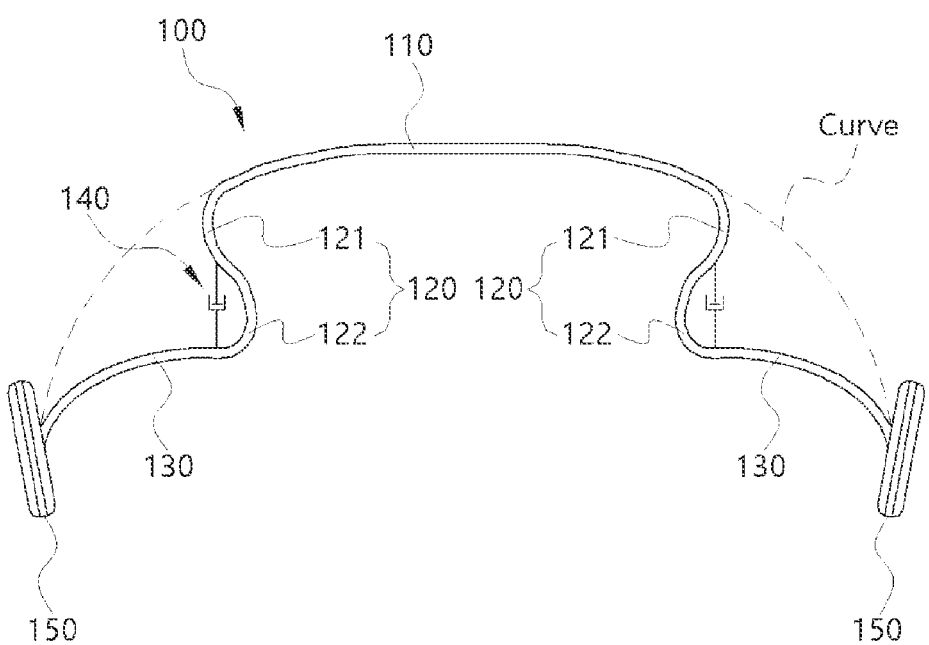
FIG. 4 is a front view of a leaf spring type landing gear according to an exemplary embodiment of the present disclosure.

FIGS. 3 and 4 relate to the leaf spring type landing gear according to the present disclosure. FIG. 3 is a front view of an aircraft on which the leaf spring type landing gear according to the present disclosure is mounted, and FIG. 4 is a front view of a leaf spring type landing gear according to an exemplary embodiment of the present disclosure.

Referring to FIG. 3, a leaf spring type landing gear 100 according to the present disclosure may be mounted on a lower portion of a fuselage 11 of an aircraft 10, and the aircraft 10 may be any one of a variety of types such as a small aircraft, a light aircraft, a helicopter, and an unmanned aerial vehicle. In this case, one end of the leaf spring type landing gear 100 may be coupled to the fuselage 11, and the leaf spring type landing gear 100 may be disposed to absorb shocks generated during takeoff and landing of the aircraft 10. For instance, the leaf spring type landing gear 100 may absorb a high impact load generated when the aircraft 10 lands at a relatively high speed. Hereinafter, in the following description, a direction in which the aircraft 10 travels is defined as a front and rear direction, a distance between the air and the ground is defined as a vertical direction, and as a posture of the aircraft 10 may be changed during flight, a shape of the aircraft 10 in a state placed on the ground will be described as a reference.

Referring to FIG. 4, the leaf spring type landing gear 100 according to the present disclosure may include a first frame 110, a second frame 120, and a third frame 130 connected to each other. In this case, the leaf spring type landing gear 100 according to the present disclosure may be formed in a spraddle-legged shape, and a pair of the second frame 120 and the third frame 130 may be sequentially connected to each of left and right ends of the first frame 110. In this case, the first frame 110 may be formed in an arc shape to have a circle center below, and the center of the first frame 110 may be formed in a different shape so as to be mounted on the fuselage 11 of the aircraft 10. Alternatively, a pair of the first frame 110, the second frame 120, and the third frame 130 may be connected to each of left and right sides of the fuselage 11.

The second frame 120 may include a 2-1st frame 121 and a 2-2nd frame 122 having circle centers formed in different directions. In this case, the 2-1st frame 121 and the 2-2nd frame 122 may be formed in arc shapes in which circle centers are formed right and left, respectively. Accordingly, the 2-1st frame 121 and the 2-2nd frame 122 may be bent in an S shape. In addition, the third frame 130 may be formed in an arc shape so that at least a part thereof is bent downward. In this case, the first frame 110, the second frame 120, and the third frame 130 may be integrally formed, and may be formed of a metal or a composite material according to the type of the aircraft 10 on which the leaf spring type landing gear 100 is mounted.

The leaf spring type landing gear 100 according to the present disclosure may further include a damper 140 disposed on the second frame 120. In this case, both ends of the damper 140 may be connected to the 2-1st frame 121 and the 2-2nd frame 122, respectively. An attachment position of the damper 140 may vary according to stroke characteristics, and may be implemented in various types of dampers such as an elastic body type damper, for example, a rubber or spring type damper, and hydraulic type, pneumatic type, and oleo-pneumatic type dampers.

The leaf spring type landing gear 100 according to the present disclosure may further include a wheel 150 disposed at an end of the third frame 130. In addition, although not illustrated, a skid extending in the front and rear direction may be disposed at the end of the third frame 130.

Figure 5:
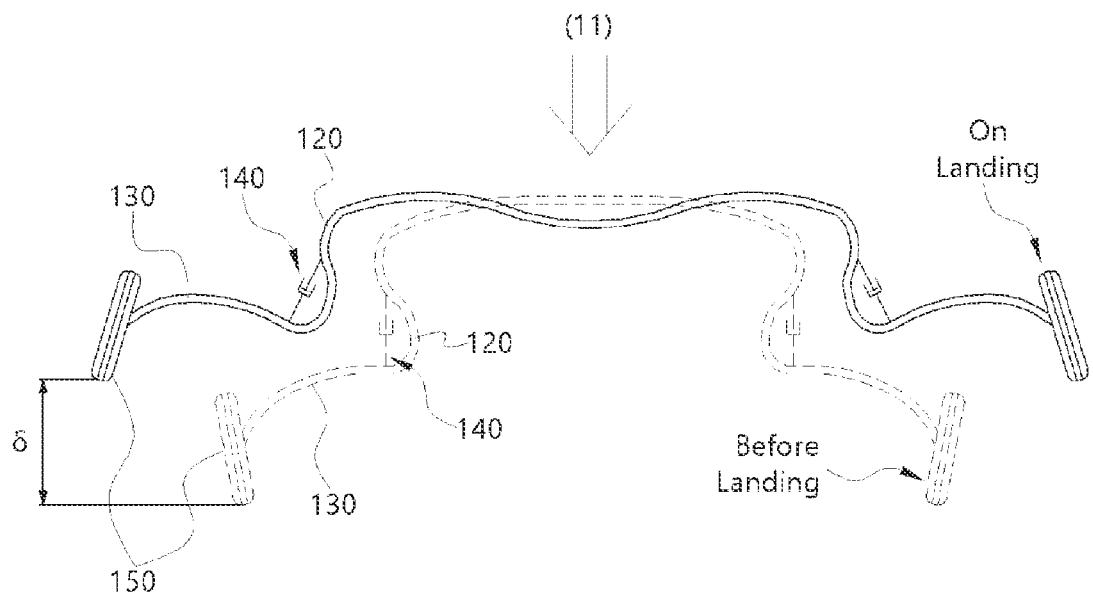
FIG. 5 is a view illustrating a leaf spring type landing gear in which strain is generated due to landing according to an exemplary embodiment of the present disclosure.
Figure 6:
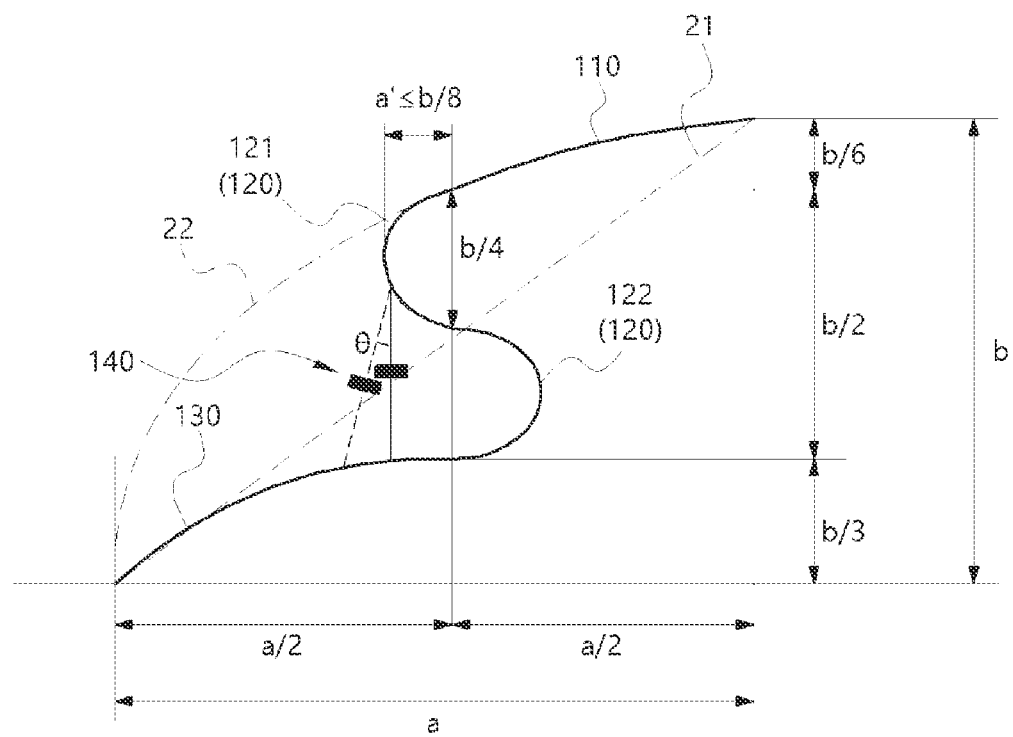
FIG. 6 is a view illustrating a frame of a leaf spring type landing gear according to an exemplary embodiment of the present disclosure.

FIGS. 5 and 6 relate to the leaf spring type landing gear according to an exemplary embodiment of the present disclosure. FIG. 5 is a front view illustrating a leaf spring type landing gear in which strain is generated due to landing, and FIG. 6 is a view illustrating the frame of the leaf spring type landing gear.

Referring to FIG. 5, when the leaf spring type landing gear 100 according to the present disclosure lands on the ground, a predetermined strain may occur due to the weight of the fuselage 11. The amount of strain (δ) generated at this time is a factor determining shock mitigation. Although if the amount of strain (δ) is larger, the aircraft may bounce into the air due to dissipated energy. The leaf spring type landing gear 100 according to the present disclosure may reduce the bounce of the aircraft by the structure of the first frame 110, the second frame 120, and the third frame 130, and the damper 140 disposed on the second frame 120. Therefore, the leaf spring type landing gear 100 may provide more comfort to an occupant while reducing energy transferred to the fuselage 11.

Referring to FIG. 6, the first frame 110, the second frame 120, and the third frame 130 may have a standard width a in the front and rear direction and a standard height b in the vertical direction. In this case, the height of the second frame 120 may be greater than each of the heights of the first frame 110 and the third frame 130. The height of the third frame 130 may be greater than the height of the first frame 110. As an example, a height ratio of the first frame 110, the second frame 120, and the third frame 130 may be 1:3:2.

An inflection point between the 2-1st frame 121 and the 2-2nd frame 122 of the second frame 120 may be located at the central portion of the end of the first frame 110 and the end of the third frame 130. In this case, when the inflection point is located at the center, a length from the inflection point of the second frame 120 to the end of the first frame 110 may correspond to a length from the inflection point of the second frame 120 to the end of the third frame 130. In this case, the central portion may mean a portion corresponding to 0.4 to 0.6 of the standard width a. In addition, a width a' of the 2-1st frame 121 or the 2-2nd frame 122 may be ⅛ or less of the standard height b.

Upper and lower ends of the damper 140 may be connected to the 2-1st frame 121 and the 2-2nd frame 122, respectively. In this case, the damper 140 may be disposed so that the lower end is inclined at a predetermined angle (θ) with respect to the upper end. When it is assumed that a direction of the damper 140 adjacent to the third frame 130 is a positive (+) direction and a direction opposite to the direction is a negative (−) direction, the predetermined angle (θ) of the damper 140 may be formed at −10° to +15° according to stroke characteristics.

Figure 7:
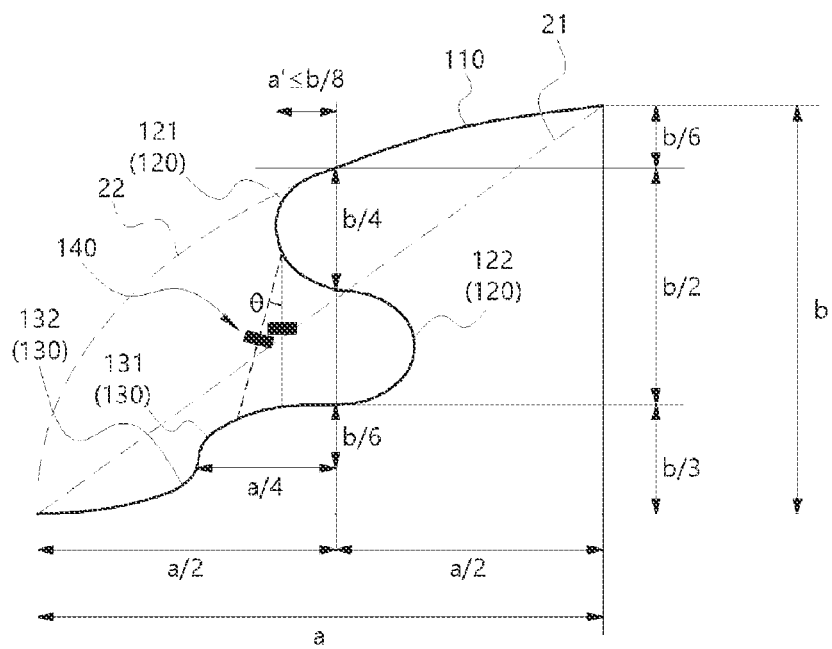
FIG. 7 is a view illustrating a frame of a leaf spring type landing gear according to another exemplary embodiment of the present disclosure.

FIG. 7 relates to a leaf spring type landing gear according to another exemplary embodiment of the present disclosure, and FIG. 7 is a view illustrating a frame of the leaf spring type landing gear.

Referring to FIG. 7, in the leaf spring type landing gear 100 according to the present disclosure, the third frame 130 may include a 3-1st frame 131 and a 3-2nd frame 132 and may be bent in an S shape. In this case, the 3-1st frame 131 may be connected to the second frame 120 and may be bent in an arc shape to have a circle center below, and the 3-2nd frame 132 may be connected to the 3-1st frame 131 and may be bent in an arc shape to have a circle center above. The circle center of the 3-1st frame 131 may be biased to the right and the circle center of the 3-2nd frame 132 may be biased to the left. In addition, an inflection point between the 3-1st frame 131 and the 3-2nd frame 132 may be located at the central portion of the left and right widths of the third frame 130.

In FIGS. 6 and 7, a linear-shaped frame 21 and an arc-shaped frame 22 are illustrated together. In the following description, the leaf spring type landing gear 100 having the same standard width a and standard height b according to the present disclosure will be compared with the leaf spring type landing gear 100 including the linear-shaped frame 21 and the arc-shaped frame 22.

Figure 8:
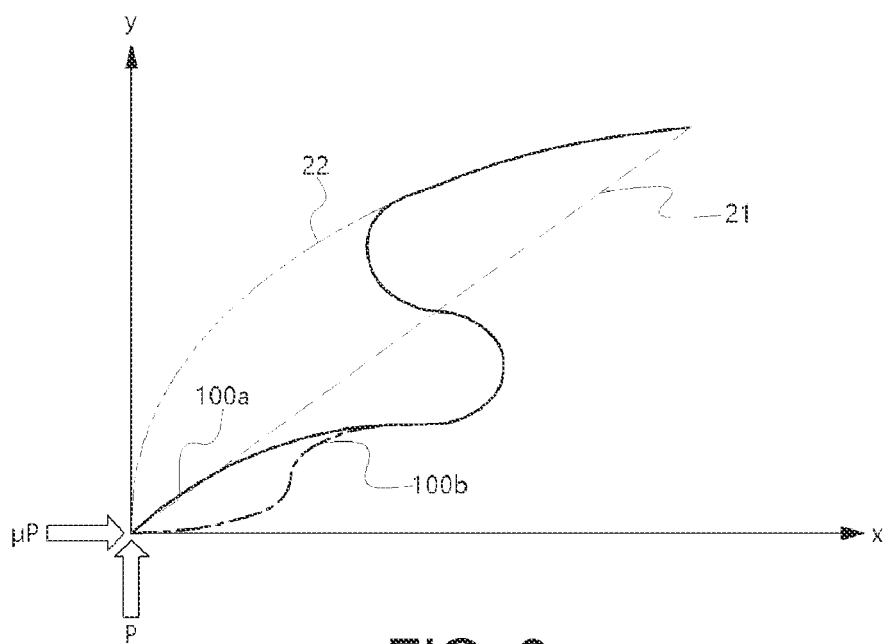
FIG. 8 is a graph showing a comparison of the frame of the leaf spring type landing gear according to the present disclosure and the frame of the landing gear according to the related art.
Figure 9A:
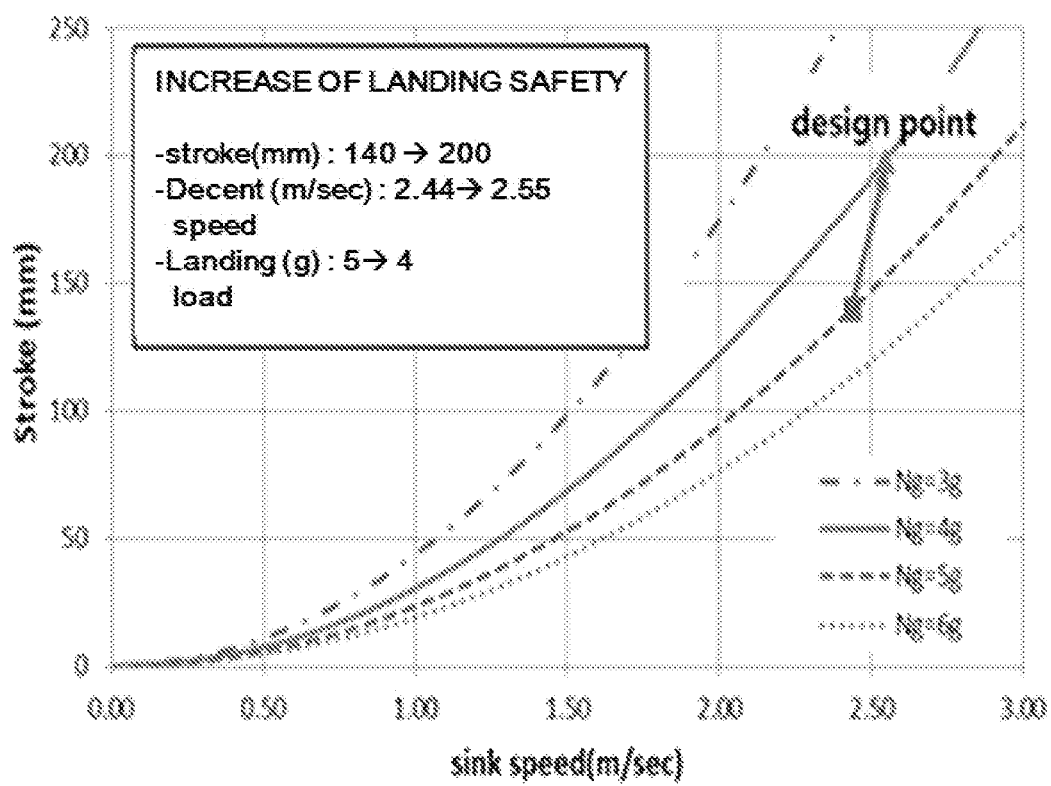
FIGS. 9A and 9B are graphs showing characteristics of the leaf spring type landing gear according to the present disclosure.
Figure 9B:
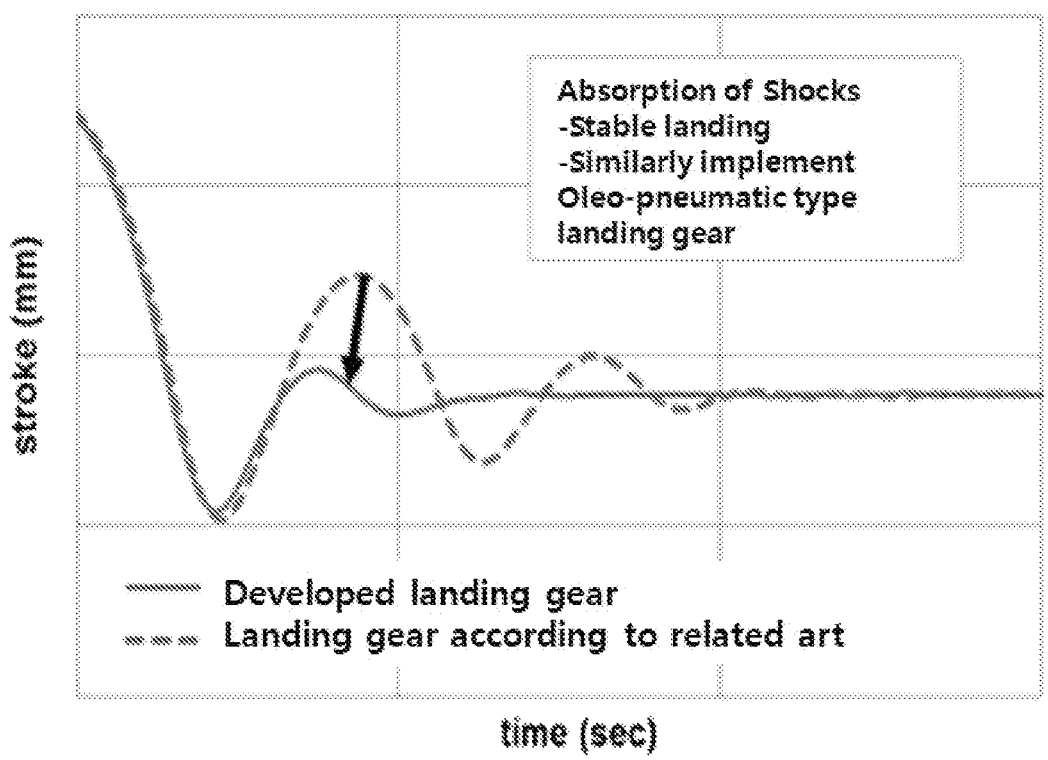
Figure 10A:
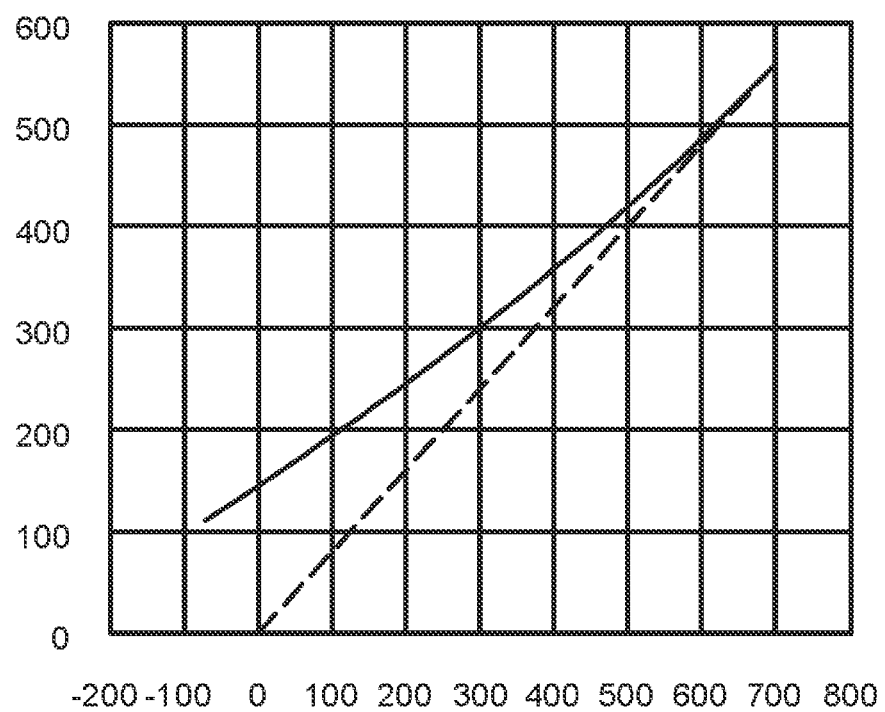
FIGS. 10A to 10D and FIGS. 11A to 11D are graphs showing comparisons of displacements and the amounts of strain of the leaf spring type landing gear according to the present disclosure and the landing gear according to the related art.
Figure 10B:
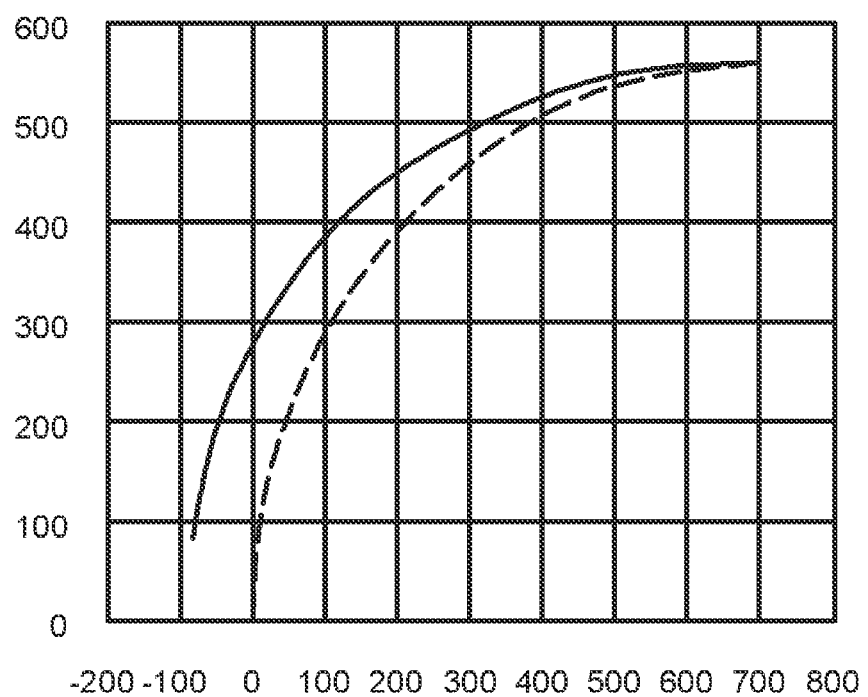
Figure 10C:
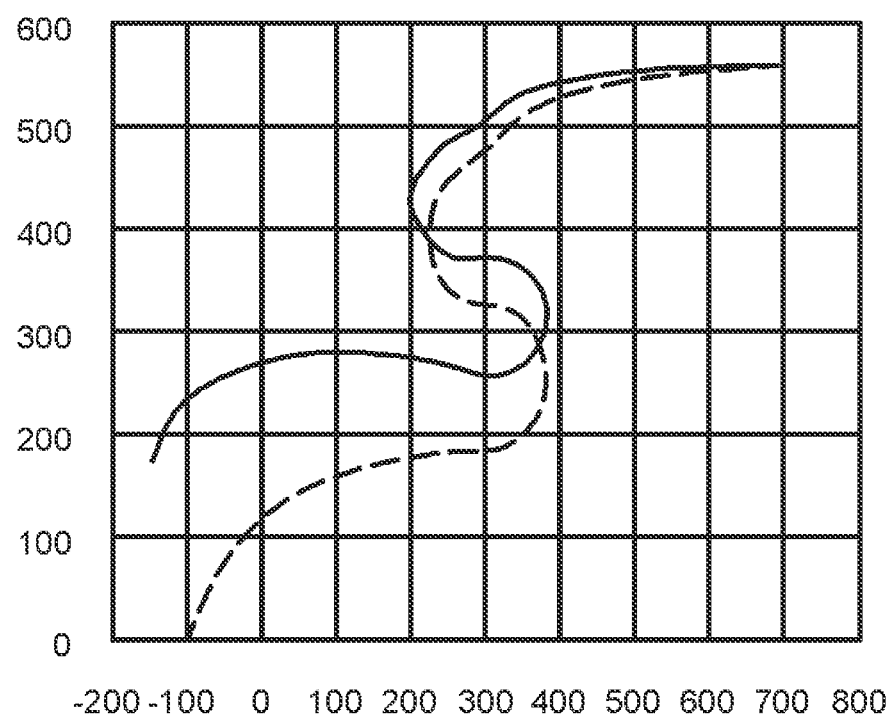
Figure 10D:
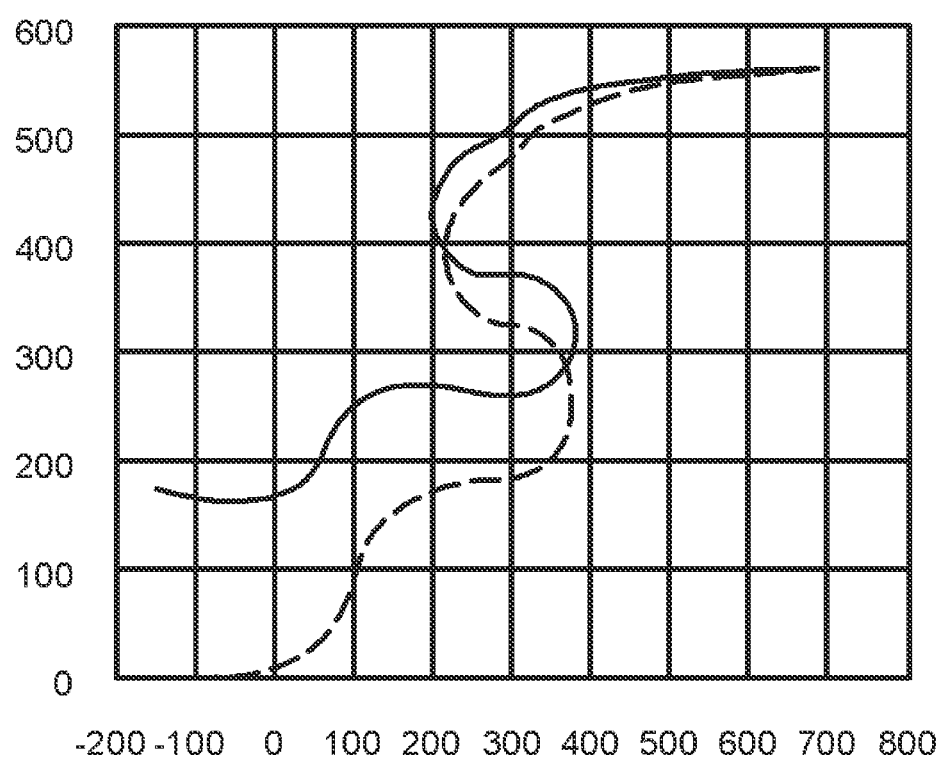
Figure 11A:
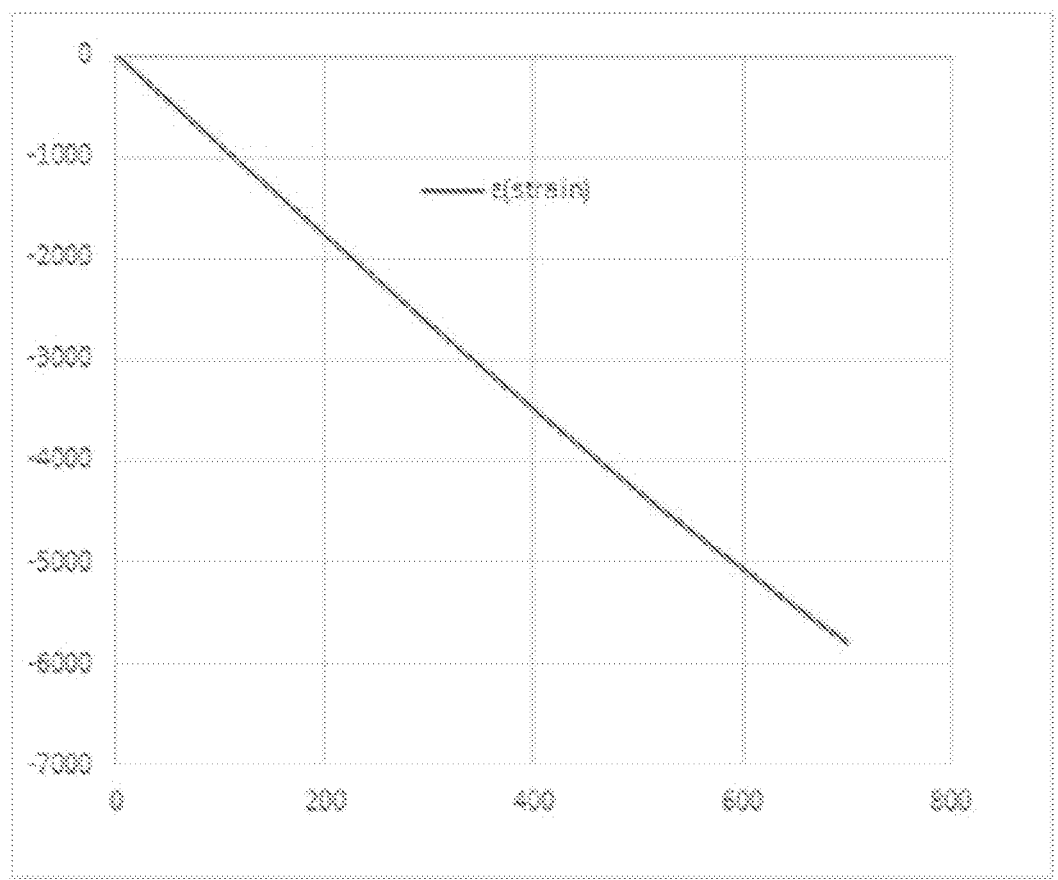
Figure 11B:
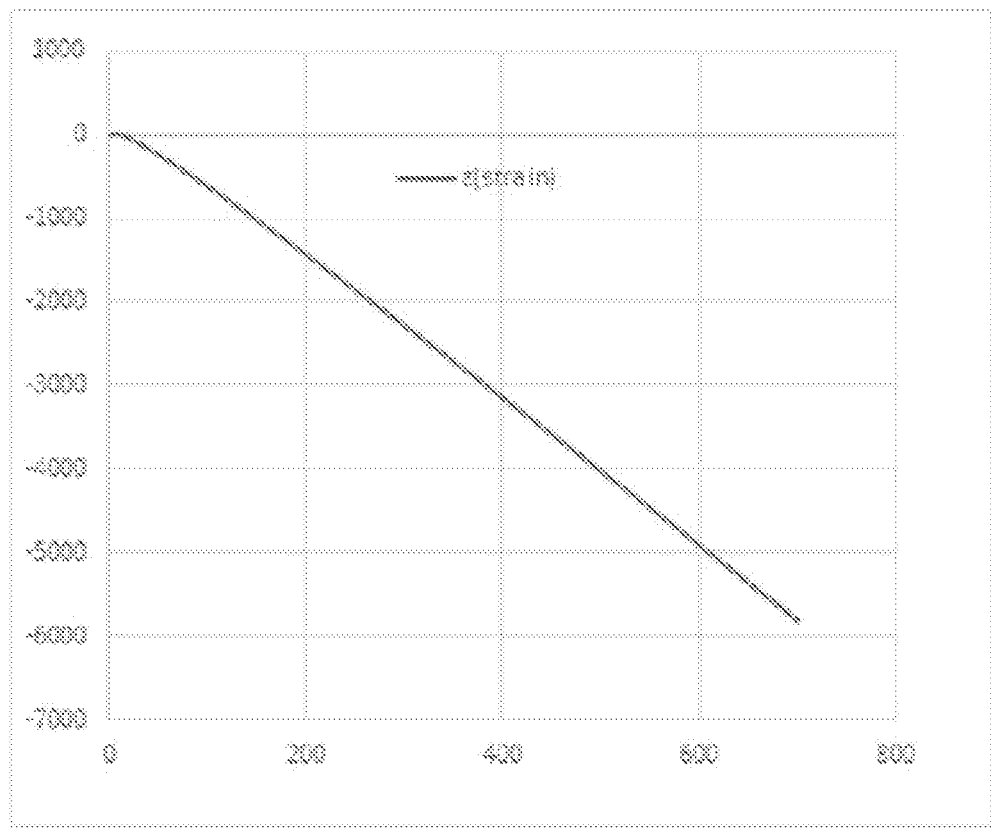
Figure 11C:
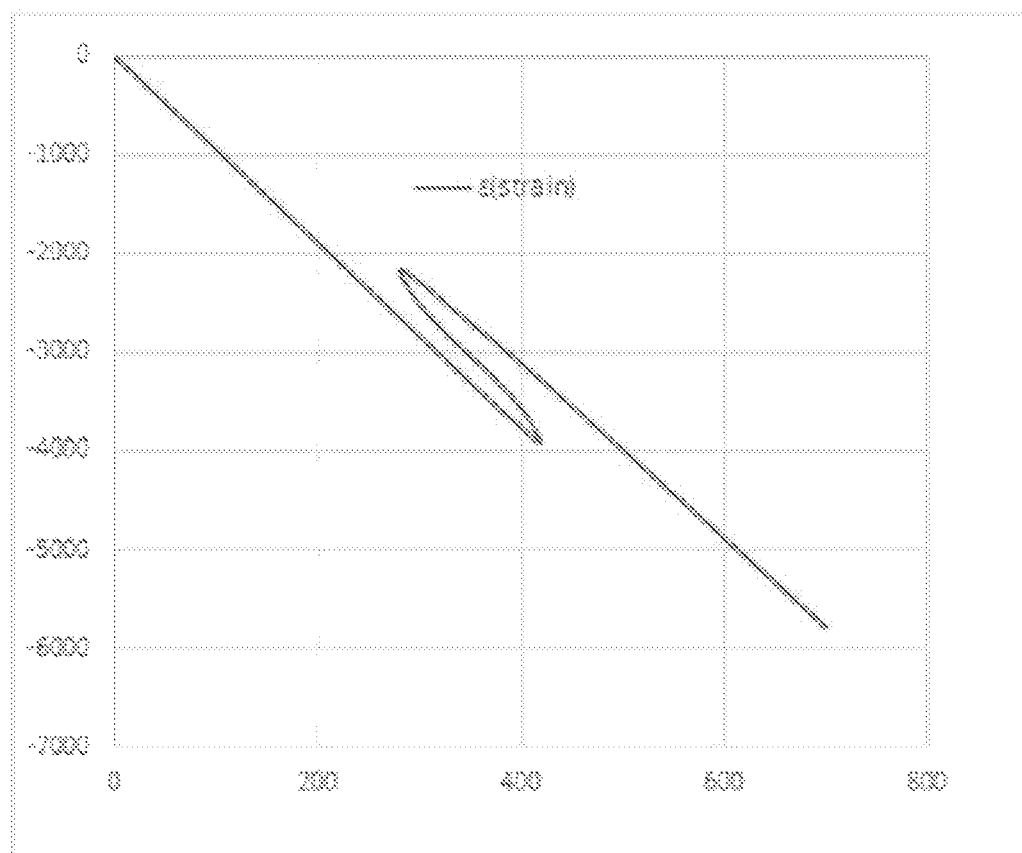
Figure 11D:
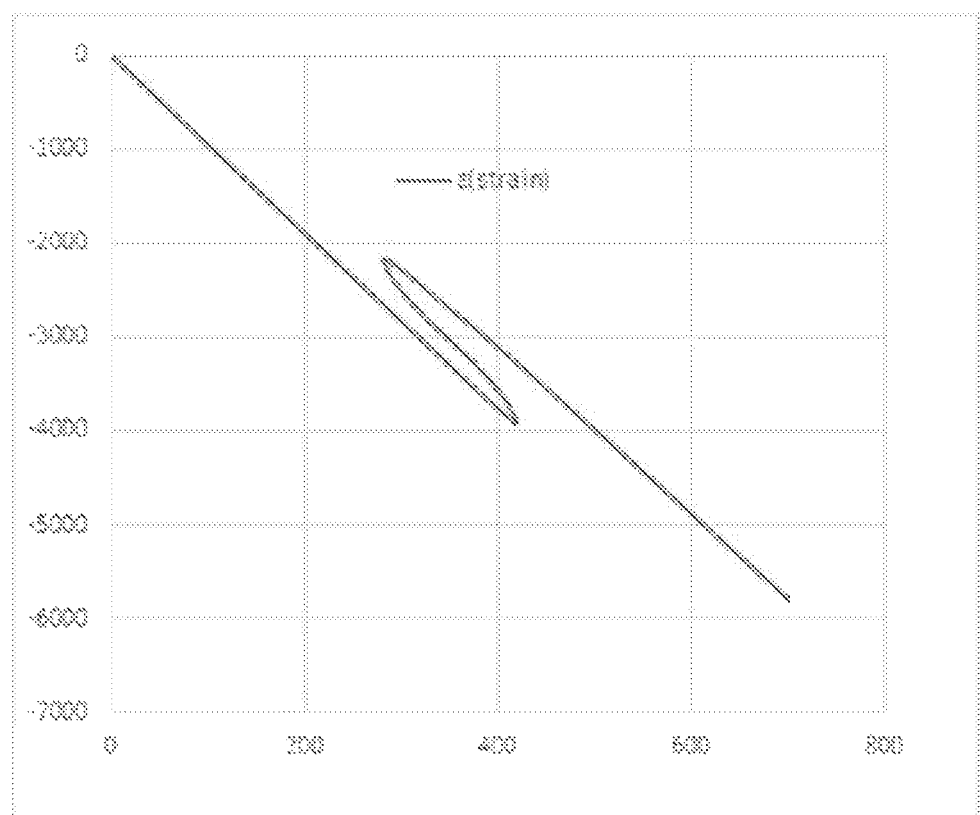

FIG. 8 and FIGS. 9A and 9B relate to the leaf spring type landing gear according to the present disclosure. FIG. 8 is a graph showing a comparison of the frame of the leaf spring type landing gear according to the present disclosure and the frame of the landing gear according to the related art, and FIGS. 9A and 9B are graphs showing characteristics of the leaf spring type landing gear according to the present disclosure.

FIG. 8 illustrates a friction force (μP) and a ground load at the time of landing. A moment (M) may be calculated according to the following equation.

In this case, the strain is large as the moment is large because the strain is proportional to the moment. As illustrated in FIG. 8, a magnitude of the moment applied to the arc-shaped frame 22 is smaller than that applied to the linear-shaped frame 21, and thus, the amount of strain of the arc-shaped frame 22 is smaller than that of the linear-shaped frame 21 when the same load is applied. On the other hand, in the leaf spring type landing gear 100 according to the present disclosure, a large magnitude of the moment is applied to an outer leg portion based on the central portion. In addition, as a relatively small magnitude of the moment is applied to a root portion, the amount of strain is large at the root portion. Therefore, the root portion to which a maximum magnitude of the moment is applied may satisfy strength with a cross-sectional area such as a linear shape or an elliptical shape. Since strain of a leaf spring type landing gear 100b according to another exemplary embodiment of the present disclosure is larger than that of a leaf spring type landing gear 100a according to an exemplary embodiment of the present disclosure, a skid type landing gear may be suitable for the leaf spring type landing gear 100b, and a wheel type landing gear may be suitable for the leaf spring type landing gear 100a.

Referring to FIG. 9A, in the leaf spring type landing gear 100 according to the present disclosure, a length of a stroke may be changed according to a descent speed and a landing load. In addition, the standard height b, the standard width a, the skid type or the wheel type, and the like may be selectively designed based on the numerical values set at the time of design. In addition, when compared with the arc-shaped frame 22 according to the related art, as illustrated in FIG. 9B, it is possible to similarly implement an oleo-pneumatic type landing gear through a more stable landing and an elastic body.

FIGS. 10A to 10D and FIGS. 11A to 11D relate to the leaf spring type landing gear according to the present disclosure. FIGS. 10A to 10D and FIGS. 11A to 11D are graphs showing comparisons of displacements and the amounts of strain of the leaf spring type landing gear according to the present disclosure and the landing gear according to the related art.

FIGS. 10A to 10D and FIGS. 11A to 11D illustrate the results of the linear-shaped frame 21, the arc-shaped frame 22, the leaf spring type landing gear 100a according to an exemplary embodiment, and the leaf spring type landing gear 100b according to another exemplary embodiment analyzed by setting design variables shown in the table below.

TABLE 1

| Classification | | Numerical value | Unit |
| --- | --- | --- | --- |
| Weight of aircraft | | 600 | (kg) |
| Landing load | | 4 | (g) |
| Standard width a | | 700 | (mm) |
| Standard height b | | 500 | (mm) |
| Load | P | 1,200 | (kg) |
| conditions | μ | 0.3 | — |

In addition, the results analyzed by inputting the thickness t and the width of each frame as 24 mm and 150 mm, respectively, are illustrated in FIGS. 10A to 10D and FIGS. 11A to 11D.

FIGS. 10A to 10D and FIGS. 11A to 11D illustrate that the stroke of the amount of strain (δ) is 110 mm for the linear-shaped frame 21, 87 mm for the arc-shaped frame 22, 176 mm for the leaf spring type landing gear 100a according to an exemplary embodiment, and 177 mm for the leaf spring type landing gear 100b according to another exemplary embodiment. As described above, it may be appreciated that the amount of strain (δ) of the leaf spring type landing gear 100 according to the present disclosure is significantly different from that of the shape of the leaf spring type landing gear according to the related art. In addition, it may be appreciated that the performance for mitigation and absorption of shocks is enhanced as the amount of strain (δ) is increased.

As set forth above, the leaf spring type landing gear according to the present disclosure may significantly mitigate and absorb shocks by the configuration described above even at a high landing descent speed, and thus may have higher safety and comfort.

Further, since the leaf spring type landing gear according to the present disclosure satisfies both rigidity and strength, a size of a strut may be smaller, such that the weight efficiency may be increased.

Further, the leaf spring type landing gear according to the present disclosure may come into contact with the ground together with the skid to which a part of the third frame is connected during landing. Accordingly, the moment energy to be transferred may be reduced.

Further, in the leaf spring type landing gear according to the present disclosure, even when the descent speed exceeds the designed speed due to engine failure or turbulence, a large concentrated load is applied to the inner contact point and the damper attachment point, and damage to these points occurs, such that the energy transferred to the fuselage is significantly reduced and there is no overturning or damage to the fuselage. As a result, the safety may be further improved.

The present disclosure is not limited to the exemplary embodiments described above, but may be variously applied. In addition, the present disclosure may be variously modified by those skilled in the art to which the present disclosure pertains without departing from the gist of the present disclosure.

The invention claimed is:

1. A leaf spring landing gear mounted on a lower portion of a fuselage of an aircraft, comprising:
a first frame connected to the fuselage and bent to have a circle center below;
a second frame formed in a pair and connected to both sides of the first frame in the width direction, respectively, extending outward in the width direction of the first frame; and
a third frame formed in a pair and connected to the second frame disposed on one side in the width direction of the first frame and the second frame disposed on the other side in the width direction of the first frame, respectively, extending outward in the width direction of the second frame and at least partially bent to have a circle center below the third frame,
wherein the second frame includes a 2-1st frame connected to the first frame and a 2-2nd frame connected to the third frame having circle centers formed in opposite directions and is formed to be bent in an S shape.

2. The leaf spring landing gear of claim 1, wherein the first frame, the second frame, and the third frame are integrally formed.

3. The leaf spring landing gear of claim 2, wherein the second frame and the third frame form a spraddle-legged shape.

4. A leaf spring landing gear mounted on a lower portion of a fuselage of an aircraft, comprising:
a first frame connected to the fuselage and bent to have a circle center below;
a second frame connected to the first frame; and
a third frame connected to the second frame and at least partially bent to have a circle center below,
wherein the second frame includes a 2-1st frame and a 2-2nd frame having circle centers formed in opposite directions and is formed to be bent in an S shape, and
wherein the third frame includes a 3-1st frame connected to the second frame and bent to have a circle center below and a 3-2nd frame connected to the 3-1st frame and bent to have a circle center above, and is formed to be bent in an S shape.

5. The leaf spring landing gear of claim 4, wherein the 3-2nd frame comes into contact with the ground when the aircraft lands.

6. The leaf spring landing gear of claim 1, further comprising a damper having both ends connected to the 2-1st frame and the 2-2nd frame, respectively, an upper end connected to the 2-1st frame, and a lower end connected to the 2-2nd frame.

7. The leaf spring landing gear of claim 6, wherein the damper is disposed so that the other end is inclined at a predetermined angle with respect to a lower side from one end connected to the 2-1st frame, and the predetermined angle is formed at −10° to +15°.

8. The leaf spring landing gear of claim 1, wherein a vertical height of the second frame is greater than a vertical height of each of the first frame and the third frame.

9. The leaf spring landing gear of claim 8, wherein the vertical height of the third frame is greater than the vertical height of the first frame.

10. The leaf spring landing gear of claim 8, wherein an inflection point between the 2-1st frame and the 2-2nd frame is located at the center in both directions with respect to ends of the first frame and the third frame.

11. The leaf spring landing gear of claim 10, wherein the circle centers of the 2-1st frame and the 2-2nd frame are formed in the both directions, respectively.

12. The leaf spring landing gear of claim 1, further comprising a wheel connected to the other end of the third frame.

* * * * *